(12) United States Patent
Takahashi

(10) Patent No.: US 10,797,543 B2
(45) Date of Patent: Oct. 6, 2020

(54) ROTATING ELECTRIC MACHINE

(71) Applicant: DENSO CORPORATION, Kariya, Aichi-pref. (JP)

(72) Inventor: Yuuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/333,878

(22) PCT Filed: Sep. 11, 2017

(86) PCT No.: PCT/JP2017/032624
§ 371 (c)(1),
(2) Date: Mar. 15, 2019

(87) PCT Pub. No.: WO2018/051938
PCT Pub. Date: Mar. 22, 2018

(65) Prior Publication Data
US 2019/0207440 A1    Jul. 4, 2019

(30) Foreign Application Priority Data

Sep. 15, 2016    (JP) .................................. 2016-181011

(51) Int. Cl.
*H02K 1/24* (2006.01)
*H02K 19/10* (2006.01)
*H02K 19/22* (2006.01)

(52) U.S. Cl.
CPC .............. *H02K 1/243* (2013.01); *H02K 1/24* (2013.01); *H02K 19/10* (2013.01); *H02K 19/22* (2013.01); *H02K 2213/03* (2013.01)

(58) Field of Classification Search
CPC .......... H02K 1/24; H02K 1/243; H02K 19/10; H02K 19/22; H02K 2213/03
(Continued)

(56) References Cited

U.S. PATENT DOCUMENTS

| | | | | | |
|---|---|---|---|---|---|
| 5,675,203 | A | * | 10/1997 | Schulze | .................... B60K 6/26 310/113 |
| 7,511,395 | B2 | * | 3/2009 | Han | ........................ H02K 16/02 310/114 |
| 2009/0152979 | A1 | * | 6/2009 | Isogai | ................... H02K 21/044 310/263 |

FOREIGN PATENT DOCUMENTS

| JP | 09098556 | A | * | 4/1997 |
|---|---|---|---|---|
| JP | H09-98556 | A | | 4/1997 |

(Continued)

OTHER PUBLICATIONS

JPO machine translation of JP 11263212 A—Belschner, Ralf DR (Year: 1999).*

(Continued)

*Primary Examiner* — Naishadh N Desai
(74) *Attorney, Agent, or Firm* — Oliff PLC

(57) ABSTRACT

A rotating electric machine includes a stator and a rotor. The stator includes a stator core and an armature coil wound on the stator core. The rotor is arranged radially inside the stator to radially face the stator. The rotor includes: a field core having a plurality of magnetic pole portions for respectively forming a plurality of magnetic poles the polarities of which are alternately different in a circumferential direction; a field coil wound on the field core; and a tubular short-circuiting member that is arranged radially outside the magnetic pole portions to cover radially outer surfaces of the magnetic pole portions and magnetically connects each circumferentially-adjacent pair of the magnetic pole portions. The short-circuiting member is provided within an axial range between two axial ends of the stator core.

6 Claims, 8 Drawing Sheets

(58) Field of Classification Search
USPC .................................................. 310/179–210
See application file for complete search history.

(56) References Cited

FOREIGN PATENT DOCUMENTS

| | | | |
|---|---|---|---|
| JP | 11263212 A | * | 9/1998 |
| JP | H11-318064 A | | 11/1999 |
| JP | 2001-086668 A | | 3/2001 |
| JP | 2018-046690 A | | 3/2018 |

OTHER PUBLICATIONS

Nov. 21, 2017 International Search Report issued in International Patent Application No. PCT/JP2017/032624.

* cited by examiner

FLOW OF MAGNETIC FLUX

FLOW OF MAGNETIC FLUX

ROTATING ELECTRIC MACHINE

TECHNICAL FIELD

The present invention relates to rotating electric machines.

BACKGROUND ART

Conventionally, there have been known rotating electric machines which are used in vehicles as electric motors and electric generators and which include a stator and a rotor (see, for example, Patent Document 1). In these rotating electric machines, the stator includes a stator core and an armature coil (or stator coil) wound on the stator core. The stator core has an annular part, a plurality of teeth each extending radially inward from the annular part and arranged at predetermined intervals in a circumferential direction, and a plurality of slots each of which is formed between one circumferentially-adjacent pair of the teeth. The armature coil is wound around the teeth and has slot-accommodated parts, which are accommodated in the slots, and a pair of coil end parts protruding axially outward respectively from two axial ends of the stator core.

The rotor is arranged radially inside the stator to radially face the stator. The rotor includes a field core, a field coil and a tubular member. The field core consists of a pair of pole cores. Each of the pole cores has a boss portion, a disc portion extending radially outward from an axial end of the boss portion, and a plurality of magnetic pole portions that are connected with the disc portion, are located radially outside the boss portion and protrude in an axial direction. The magnetic pole portions are arranged at predetermined intervals in a circumferential direction of the rotor. Moreover, the pair of pole cores are assembled to each other so that the magnetic pole portions of one of the pole cores are arranged alternately with the magnetic pole portions of the other of the pole cores in the circumferential direction. Consequently, the magnetic pole portions of the pair of pole cores respectively form a plurality of magnetic poles the polarities of which are alternately different in the circumferential direction. The field coil is wound on the radially outer side of the boss portions of the pair of pole cores. The tubular member is arranged radially outside the magnetic pole portions of the pair of pole cores to cover radially outer surfaces of the magnetic pole portions.

With the tubular member, it is possible to magnetically connect each circumferentially-adjacent pair of the magnetic pole portions and suppress distal end portions of the magnetic pole portions from being deformed radially outward by the centrifugal force during high-speed rotation of the rotor. Consequently, it is possible to reduce leakage of magnetic flux between the magnetic pole portions and thereby achieve improvement in the output; it is also possible to reduce eddy current loss in the magnetic pole portions.

PRIOR ART LITERATURE

Patent Literature

[PATENT DOCUMENT 1] Japanese Patent Application Publication No. JP2009148057A

SUMMARY OF THE INVENTION

Problems to be Solved by the Invention

When the N-pole magnetic flux and the S-pole magnetic flux alternately flow with rotation of the rotor, portions of the armature coil of the stator which are located close to the rotor are subjected to a strong alternating magnetic field, causing copper loss (i.e., so-called AC copper loss) to occur in the armature coil. The AC copper loss is increased by the fact that the magnetic flux flows from axially outer end portions of the rotor to axial ends of the stator, crossing the coil end parts of the armature coil. However, in the rotating electric machine disclosed in the above Patent Document 1, there is employed no structure taking into account the above situation; therefore, it is difficult to reduce the AC copper loss.

The present invention has been made in view of the above-described problems, and aims to provide a rotating electric machine capable of reducing the AC copper loss that occurs in the armature coil of the stator due to the magnetic flux from the rotor.

Means for Solving the Problems

According to an embodiment, a rotating electric machine includes a stator and a rotor. The stator includes a stator core and an armature coil (or stator coil) wound on the stator cor. The rotor is arranged radially inside the stator to radially face the stator. The rotor includes: a field core having a plurality of magnetic pole portions for respectively forming a plurality of magnetic poles the polarities of which are alternately different in a circumferential direction of the rotor; a field coil wound on the field core; and a tubular short-circuiting member that is arranged radially outside the magnetic pole portions to cover radially outer surfaces of the magnetic pole portions and magnetically connects each circumferentially-adjacent pair of the magnetic pole portions. The short-circuiting member is provided within an axial range between two axial ends of the stator core.

With the above configuration, when an alternating magnetic field is generated in the rotor, it is possible to cause magnetic flux due to the alternating magnetic field to concentrate on the short-circuiting member; it is also possible to cause the magnetic flux guided to the short-circuiting member to flow in the radial direction to the stator and perpendicularly cross slot-accommodated parts of the armature coil. That is, it is possible to suppress the magnetic flux due to the alternating magnetic field from having an axial component and flowing to the axial ends of the stator crossing coil end parts of the armature coil. As a result, it is possible to suppress the magnetic flux from the rotor from crossing the armature coil of the stator without passing through the short-circuiting member. Hence, when the alternating magnetic field is generated in the rotor, it is possible to reduce AC copper loss occurring in the armature coil of the stator due to the magnetic flux from the rotor.

In the above rotating electric machine, an axial length of the short-circuiting member is smaller than an axial length of the stator core. With this configuration, it is possible to provide the short-circuiting member within the axial range between the two axial ends of the stator core.

In the above rotating electric machine, it is preferable that a radial thickness of the short-circuiting member is larger than or equal to ½ of a radial distance between the magnetic pole portions and the stator core. In this case, it is easy for magnetic flux generated in the rotor to concentrate on the short-circuiting member without leaking to the two axial ends of the stator core.

In the above rotating electric machine, it is preferable that the radial thickness of the short-circuiting member is smaller than a radial thickness of an annular part of the stator core. In this case, it is possible to reduce iron loss (i.e., eddy current loss) due to harmonic components of the magnetic flux generated by electric current supplied to each phase winding of the stator while reliably transferring the fundamental component of the magnetic flux to the rotor.

In the above rotating electric machine, it is preferable that $W/Wst>1/(6 \cdot n)$, where n is a slot multiplier number, W is the radial thickness of the short-circuiting member and Wst is the radial thickness of the annular part of the stator core. In this case, it is possible to reduce harmonic iron loss which depends on the number of slots of the stator.

In the above rotating electric machine, it is preferable that when n=2, $W/Wst>1/12$. In this case, it is possible to reduce the harmonic iron loss which occurs due to the eleventh and thirteenth harmonic components with respect to the fundamental component of the magnetic flux generated by electric current supplied to each phase winding and which depends on the number of slots of the stator.

In the above rotating electric machine, the armature coil may be a concentratedly-wound coil which has three phases (or phase windings) offset from each other by 120° in electrical angle. In this case, it is preferable that P:N=2:3 or P:N=4:3, where P is the number of poles of the rotor and N is the number of slots of the stator. Moreover, it is also preferable that $W/Wst>1/6$, where W is the radial thickness of the short-circuiting member and Wst is the radial thickness of the annular part of the stator core. With this configuration, it is possible to ensure excellent quietness of the rotating electric machine while reducing the harmonic iron loss which depends on the number of slots of the stator.

EMBODIMENT FOR CARRYING OUT THE INVENTION

Hereinafter, an embodiment will be described with reference to FIGS. 1-15.

Figure 1:
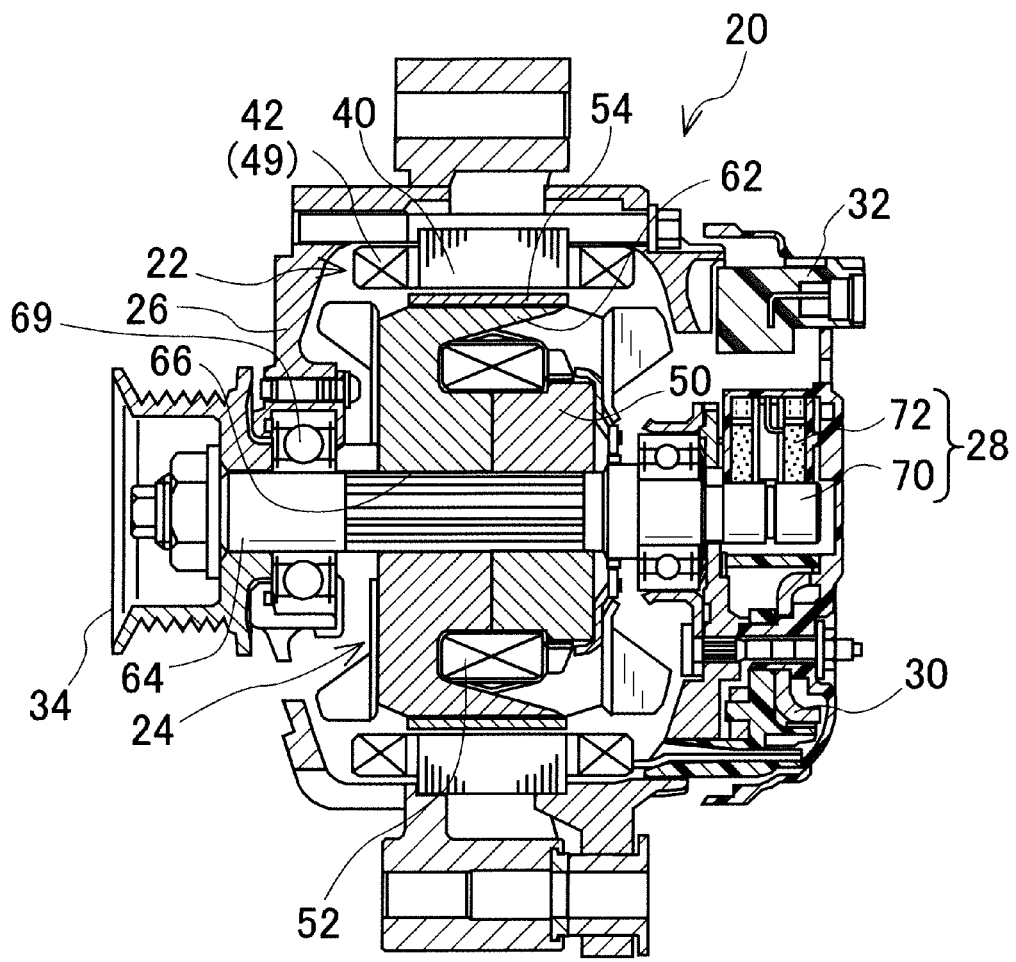
FIG. 1 is a partially cross-sectional view of a rotating electric machine according to an embodiment.
Figure 2:
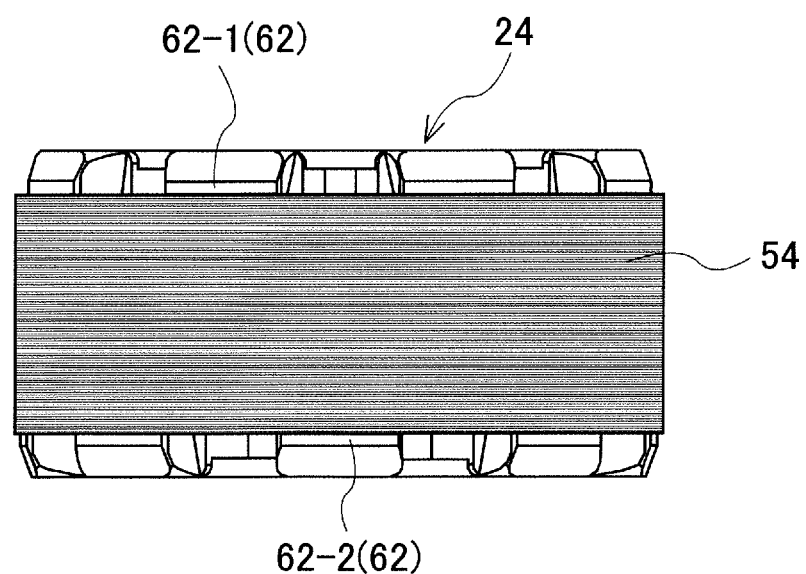
FIG. 2 is a plan view, from the radially outer side, of a rotor of the rotating electric machine.
Figure 3:
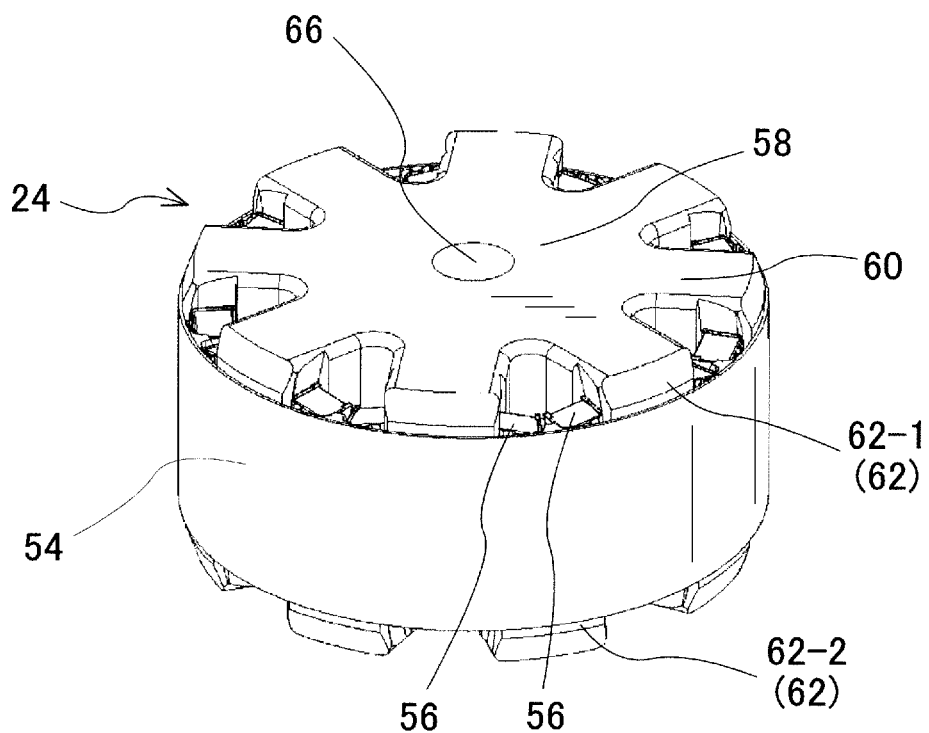
FIG. 3 is a perspective view of the rotor.
Figure 4:
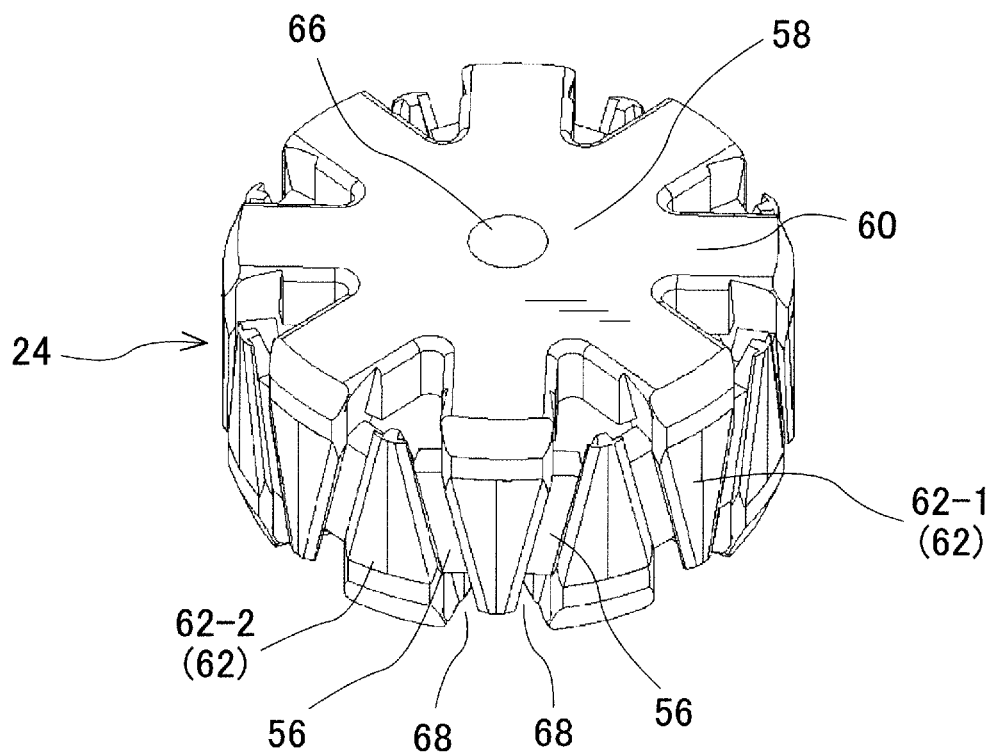
FIG. 4 is a perspective view of the rotor omitting a short-circuiting member.
Figure 5:
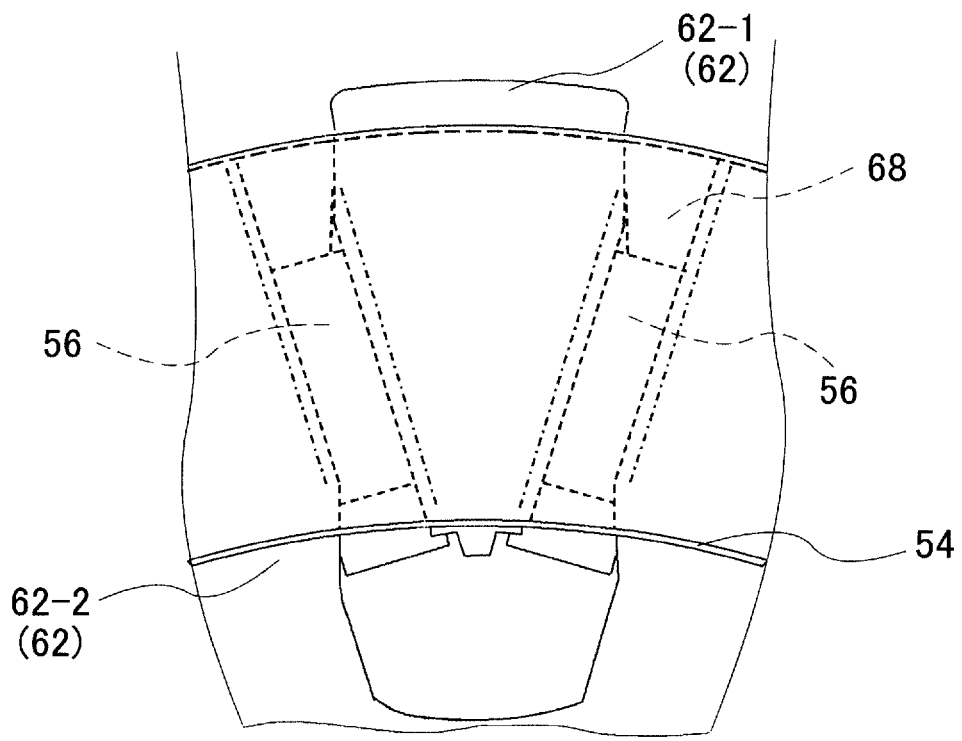
FIG. 5 is a perceptive view of part of the rotor.

FIG. 1 shows the overall configuration of a rotating electric machine 20 according the embodiment. In the present embodiment, the rotating electric machine 20 is mounted in, for example, a vehicle. The rotating electric machine 20 generates drive power for driving the vehicle upon being supplied with electric power from an electric power source such as a battery. Moreover, the rotating electric machine 20 generates electric power for charging the battery upon being supplied with mechanical power from an engine of the vehicle. As shown in FIG. 1, the rotating electric machine 20 includes a stator 22, a rotor 24, a housing 26, a brush device 28, a rectifier 30, a voltage regulator 32 and a pulley 34.

The stator 22 constitutes part of a magnetic circuit formed in the rotating electric machine 20. Moreover, the stator 22 generates electromotive force upon application of a rotating magnetic field thereto with rotation of the rotor 24. The stator 22 includes a stator core 40 and an armature coil (or stator coil) 42. The stator core 40 is formed in a cylindrical shape. In the present embodiment, the stator core 40 is constituted of a laminate in which soft-magnetic sheets, such as magnetic steel sheets made of iron or silicon steel, are laminated in the axial direction. In addition, thinning the sheets taking into account the skin depth and/or providing insulating layers between adjacent sheets is effective in reducing eddy current loss in the stator core 40 and thereby lowering the loss in the stator 22.

The stator core 40 has an annular part 44, a plurality of teeth 45 and a plurality of slots 46. The annular part 44 is formed in an annular (or cylindrical) shape. Each of the teeth 45 extends radially inward from a radially inner end of the annular part 44. Moreover, the teeth 45 are arranged at predetermined intervals in a circumferential direction. Each of the slots 46 is formed between one circumferentially-adjacent pair of the teeth 45. Consequently, the teeth 45 are located alternately with the slots 46 in the circumferential direction.

The armature coil 42 is wound on the stator core 40 (more specifically, on the teeth 45). The armature coil 42 has straight slot-accommodated parts 48, which are accommodated in the slots 46 of the stator core 40, and a pair of annular coil end parts 49 protruding axially outward respectively from two axial ends of the stator core 40. The armature coil 42 includes phase windings the number of which corresponds to the number of phases of the rotating electric machine 20 (e.g., three). Each of the phase windings of the armature coil 42 is connected with an inverter device (not shown). Voltages applied to the phase windings are controlled by controlling on/off operation of switching elements in the inverter device.

The rotor 24 is arranged radially inside the stator 22 (more specifically, radially inner end surfaces of the teeth 45) to face the stator 22 with a predetermined air gap formed therebetween. The rotor 24 constitutes part of the magnetic circuit formed in the rotating electric machine 20. Moreover, the rotor 24 forms magnetic poles upon being supplied with electric current. In the present embodiment, the rotor 24 is configured as a so-called Lundell-type rotor. As shown in FIGS. 2-5, the rotor 24 includes a field core 50, a field coil 52, a short-circuiting member 54 and a plurality of permanent magnets 56.

The field core 50 consists of a pair of pole cores. The pole cores are formed by, for example, forging. Each of the pole cores has a boss portion 58, a disc portion 60 and a plurality of claw-shaped magnetic pole portions 62. The boss portion 58 is cylindrical-shaped and has a shaft hole 66 formed along its central axis. In the shaft hole 66, there is fitted and fixed a rotating shaft 64. The disc portion 60 is disc-shaped and extends radially outward from an axially outer end portion of the boss portion 58.

Each of the claw-shaped magnetic pole portions 62 is connected with a radially outer end of the disc portion 60 and protrudes in a claw shape from the radially outer end of the disc portion 60 axially inward. That is, each of the claw-shaped magnetic pole portions 62 is located radially outside the boss portion 58. Moreover, each of the claw-shaped magnetic pole portions 62 has a substantially circular arc-shaped radially outer surface. Specifically, the radially outer surface of each of the claw-shaped magnetic pole portions 62 includes a circular arc centered at the central axis of the rotating shaft 64 or at a position closer than the central axis of the rotating shaft 64 to the claw-shaped magnetic pole portion 62.

Hereinafter, for the sake of convenience, the claw-shaped magnetic pole portions 62 of one of the pair of pole cores will be referred to as first claw-shaped magnetic pole portions 62-1 and the claw-shaped magnetic pole portions 62 of the other of the pair of pole cores will be referred to as second claw-shaped magnetic pole portions 62-2. The first claw-shaped magnetic pole portions 62-1 are arranged at predetermined intervals in the circumferential direction. The second claw-shaped magnetic pole portions 62-2 are also arranged at predetermined intervals in the circumferential direction. The number of the first claw-shaped magnetic pole portions 62-1 and the number of the second claw-shaped magnetic pole portions 62-2 are set to the same number (e.g., eight). The polarity (e.g., N) of magnetic poles formed by the first claw-shaped magnetic pole portions 62-1 and the polarity (e.g., S) of magnetic poles formed by the second claw-shaped magnetic pole portions 62-2 are different from (or opposite to) each other. The pair of pole cores are assembled to each other so that the first claw-shaped magnetic pole portions 62-1 are arranged alternately with the second claw-shaped magnetic pole portions 62-2 in the circumferential direction. Moreover, between each circumferentially-adjacent pair of the first and second claw-shaped magnetic pole portions 62-1 and 62-2, there is formed a gap 68.

Each of the first claw-shaped magnetic pole portions 62-1 protrudes in the claw shape from a first axial end (i.e., the upper end in FIG. 4) of the field core 50 toward a second axial end (i.e., the lower end in FIG. 4) of the field core 50. Each of the second claw-shaped magnetic pole portions 62-2 protrudes in the claw shape from the second axial end of the field core 50 toward the first axial end of the field core 50. The first claw-shaped magnetic pole portions 62-1 and the second claw-shaped magnetic pole portions 62-2 are identically shaped except for the positions at which they are arranged and the axial sides to which they protrude. The first claw-shaped magnetic pole portions 62-1 and the second claw-shaped magnetic pole portions 62-2 are arranged so that proximal end portions (or distal end portions) of the first claw-shaped magnetic pole portions 62-1 are on the axially opposite side to those of the second claw-shaped magnetic pole portions 62-2. Moreover, the first claw-shaped magnetic pole portions 62-1 and the second claw-shaped magnetic pole portions 62-2 are magnetized into different polarities.

Each of the claw-shaped magnetic pole portions 62 is formed to have a predetermined width in the circumferential direction (i.e., circumferential width) and a predetermined thickness in the radial direction (i.e., radial thickness). Moreover, each of the claw-shaped magnetic pole portions 62 is formed so that both the circumferential width and radial thickness of the claw-shaped magnetic pole portion 62 gradually decrease from the proximal end portion of the claw-shaped magnetic pole portion 62 in the vicinity of the disc portion 60 to the distal end portion of the claw-shaped magnetic pole portion 62. In other words, each of the claw-shaped magnetic pole portions 62 is formed so as to become thinner in both the circumferential and radial directions from the proximal end portion thereof to the distal end portion thereof. In addition, it is preferable that each of the claw-shaped magnetic pole portions 62 is formed symmetrically with respect to a circumferential center thereof.

The gaps 68, each of which is formed between one circumferentially-adjacent pair of the first and second claw-shaped magnetic pole portions 62-1 and 62-2, extend obliquely with respect to the axial direction (i.e., are oblique at a predetermined angle to the rotation axis of the rotor 24). Moreover, each of the gaps 68 is formed so that its circumferential dimension (i.e., circumferential size) hardly changes with the axial position, in other words, its circumferential dimension is kept at a constant value or within a very narrow range including the constant value.

In addition, to prevent magnetic imbalance from occurring in the rotor 24, it is preferable that all the gaps 68 have the same shape. However, particularly in the case of the rotor 24 rotating in only one direction, to reduce the iron loss, each of the claw-shaped magnetic pole portions 62 may be formed asymmetrically with respect to the circumferential center thereof so that the circumferential dimension of the gaps 68 is not constant in the axial direction.

The field coil 52 is arranged in a radial gap between the boss portions 58 and the claw-shaped magnetic pole portions 62 of the pair of pole cores. Upon direct current flowing therethrough, the field coil 52 causes magnetic flux to be generated in the field core 50. The field coil 52 generates magnetomotive force upon being energized. The field coil 52 is wound around the boss portions 58 of the pair of pole cores. The magnetic flux generated by the field coil 52 is guided, via the boss portions 58 and the disc portions 60, to the claw-shaped magnetic pole portions 62. That is, the boss portions 58 and the disc portions 60 together form magnetic paths for guiding the magnetic flux generated by the field coil 52 to the claw-shaped magnetic pole portions 62. The field coil 52 magnetizes, with the generated magnetic flux, the first claw-shaped magnetic pole portions 62-1 into N poles and the second claw-shaped magnetic pole portions 62-2 into S poles.

The short-circuiting member 54 is cylindrical-shaped and arranged radially outside the claw-shaped magnetic pole portions 62 (i.e., the first claw-shaped magnetic pole portions 62-1 and the second claw-shaped magnetic pole portions 62-2) to cover the radially outer surfaces of the claw-shaped magnetic pole portions 62. The short-circuiting member 54 has an axial length almost equal to the axial length of the claw-shaped magnetic pole portions 62 (i.e., the axial distance from the proximal end to the distal end in each of the claw-shaped magnetic pole portions 62). Moreover, the short-circuiting member 54 has a predetermined radial thickness W (e.g., about 0.6 mm-1.0 mm with which it is possible to ensure both mechanical strength and magnetic performance in the rotor 24). The short-circuiting member 54 faces and abuts the claw-shaped magnetic pole portions 62 on their radially outer side and closes the gaps 68, each of which is formed between one circumferentially-adjacent pair of the first and second claw-shaped magnetic pole portions 62-1 and 62-2, on their radially outer side, thereby magnetically connecting the first claw-shaped magnetic pole portions 62-1 and the second claw-shaped magnetic pole portions 62-2.

The short-circuiting member 54 is formed of a soft-magnetic material, such as magnetic steel sheets made of iron or silicon steel. The short-circuiting member 54 may be constituted of a pipe-like member formed in a cylindrical shape or a laminate in which predetermined members are laminated in the axial direction. The short-circuiting member 54 is fixed to the claw-shaped magnetic pole portions 62 by shrink fitting, press fitting, welding or any combination of the aforementioned methods. In the case of the short-circuiting member 54 being constituted of a laminate, the laminate may be a member in which soft-magnetic sheets, such as magnetic steel sheets shaped by blanking, are laminated in the axial direction. In addition, to suppress eddy current loss, it is preferable to perform interlayer insulation for each axially-adjacent pair of the sheets. Alternatively, the laminate may be a single wire-like or band-like member that spirally extends and is thereby laminated in the axial direction. In terms of strength and magnetic performance, it is preferable for the wire-like or band-like member to be formed of a square bar having a rectangular cross section; however, the wire-like or band-like member may also be formed of a round wire or a wire with rounded corners.

The short-circuiting member 54 has a function of smoothing the radially outer periphery of the rotor 24 and thereby reducing wind noise caused by unevenness of the radially outer periphery of the rotor 24. Moreover, the short-circuiting member 54 also has a function of connecting the claw-shaped magnetic pole portions 62, which are arranged in the circumferential direction, to one another and thereby suppressing deformation (more particularly, radial deformation) of each of the claw-shaped magnetic pole portions 62.

The permanent magnets 56 are received on the radially inner side of the short-circuiting member 54. Each of the permanent magnets 56 is an inter-pole magnet which is arranged between one circumferentially-adjacent pair of the claw-shaped magnetic pole portions 62, i.e., arranged to fill the gap 68 formed between one circumferentially-adjacent pair of the first and second claw-shaped magnetic pole portions 62-1 and 62-2. In each of the gaps 68, there is arranged one of the permanent magnets 56; therefore, the number of the permanent magnets 56 is equal to the number of the gaps 68. Each of the permanent magnets 56 extends, along the shape of the gap 68, obliquely with respect to the rotation axis of the rotor 24. Each of the permanent magnets 56 is formed in a substantially cuboid shape. The permanent magnets 56 have a function of reducing leakage of magnetic flux between the claw-shaped magnetic pole portions 62 and thereby intensifying magnetic flux transferred between the claw-shaped magnetic pole portions 62 and the stator core 40 of the stator 22.

The permanent magnets 56 are provided to form magnetic poles that are oriented to reduce leakage magnetic flux between each circumferentially-adjacent pair of the claw-shaped magnetic pole portions 62. That is, each of the permanent magnets 56 is magnetized so that the magnetomotive force acts in the circumferential direction. Specifically, each of the permanent magnets 56 is configured to have its N pole formed at a circumferential surface thereof facing the first claw-shaped magnetic pole portion 62-1 to be magnetized into an N pole and its S pole formed at a circumferential surface thereof facing the second claw-shaped magnetic pole portion 62-2 to be magnetized into an S pole. In addition, it is preferable for the permanent magnets 56 to be magnetized after being assembled into the rotor 24; however, the permanent magnets 56 may also be assembled into the rotor 24 after being magnetized.

As shown in FIG. 1, the housing 26 accommodates both the stator 22 and the rotor 24 therein. Moreover, the housing 26 rotatably supports the rotating shaft 64 and the rotor 24 and fixes the stator 22.

The brush device 28 includes a pair of slip rings 70 and a pair of brushes 72. The slip rings 70 are fixed on one axial end portion (i.e., a right end portion in FIG. 1) of the rotating shaft 64 and have a function of supplying direct current to the field coil 52 of the rotor 24. The brushes 72 are held by a brush holder that is mounted and fixed to the housing 26. Each of the brushes 72 is arranged in a state of being pressed to the rotating shaft 64 side so that a radially inner end portion of the brush 72 can slide on the surface of a corresponding one of the slip rings 70. The brushes 72 supply direct current to the field coil 52 via the slip rings 70.

The rectifier 30 is electrically connected with the armature coil 42 of the stator 22. The rectifier 30 rectifies alternating current generated in the armature coil 42 into direct current and outputs the resultant direct current. The voltage regulator 32 is a device which regulates an output voltage of the rotating electric machine 20 by controlling the field current (i.e., direct current) supplied to the field coil 52. The voltage regulator 32 has a function of keeping the output voltage substantially constant which otherwise varies according to electrical loads and the amount of electric power generated by the rotating electric machine 20. The pulley 34 is provided to transmit rotation of the engine of the vehicle to the rotor 24 of the rotating electric machine 20. The pulley 34 is fixed, by fastening, on another axial end portion (i.e., a left end portion in FIG. 1) of the rotating shaft 64.

In the rotating electric machine 20 having the above-described structure, when direct current is supplied from the electric power source to the field coil 52 of the rotor 24 via the brush device 28, the supply of the direct current causes magnetic flux to be generated which flows through the boss portions 58, disc portions 60 and claw-shaped magnetic pole portions 62 of the pair of pole cores, penetrating the field coil 52. The magnetic flux forms a magnetic circuit along which the magnetic flux flows in the order of, for example, the boss portion 58 of one of the pair of pole cores→the disc portion 60 of the one of the pair of pole cores→the first claw-shaped magnetic pole portions 62-1→the stator core 40→the second claw-shaped magnetic pole portions 62-2→the disc portion 60 of the other of the pair of pole cores→the boss portion 58 of the other of the pair of pole cores→the boss portion 58 of the one of the pair of pole cores. The magnetic circuit generates counterelectromotive force in the rotor 24.

Upon the above-described magnetic flux being guided to the first and second claw-shaped magnetic pole portions 62-1 and 62-2, each of the first claw-shaped magnetic pole portions 62-1 is magnetized into an N pole whereas each of the second claw-shaped magnetic pole portions 62-2 is magnetized into an S pole. With the claw-shaped magnetic pole portions 62 magnetized in the above manner, three-phase alternating current, which is converted from the direct current supplied from the electric power source, is supplied to the armature coil 42, causing the rotor 24 to rotate relative to the stator 22. Consequently, it becomes possible to cause the rotating electric machine 20 to function as an electric motor that rotates with the supply of electric power to the armature coil 42.

Moreover, the rotor 24 of the rotating electric machine 20 rotates upon transmission of torque from the engine of the vehicle to the rotating shaft 64 via the pulley 34. With the rotation of the rotor 24, a rotating magnetic field is applied to the armature coil 42 of the stator 22, causing AC electromotive force to be generated in the armature coil 42. The AC electromotive force generated in the armature coil 42 is rectified by the rectifier 30 into direct current, and the resultant direct current is supplied to the battery. Consequently, it becomes possible to cause the rotating electric machine 20 to function as an electric generator that generates the electromotive force in the armature coil 42, thereby charging the battery.

Next, the characteristic configuration of the rotating electric machine 20 according to the present embodiment will be described.

Figure 7:
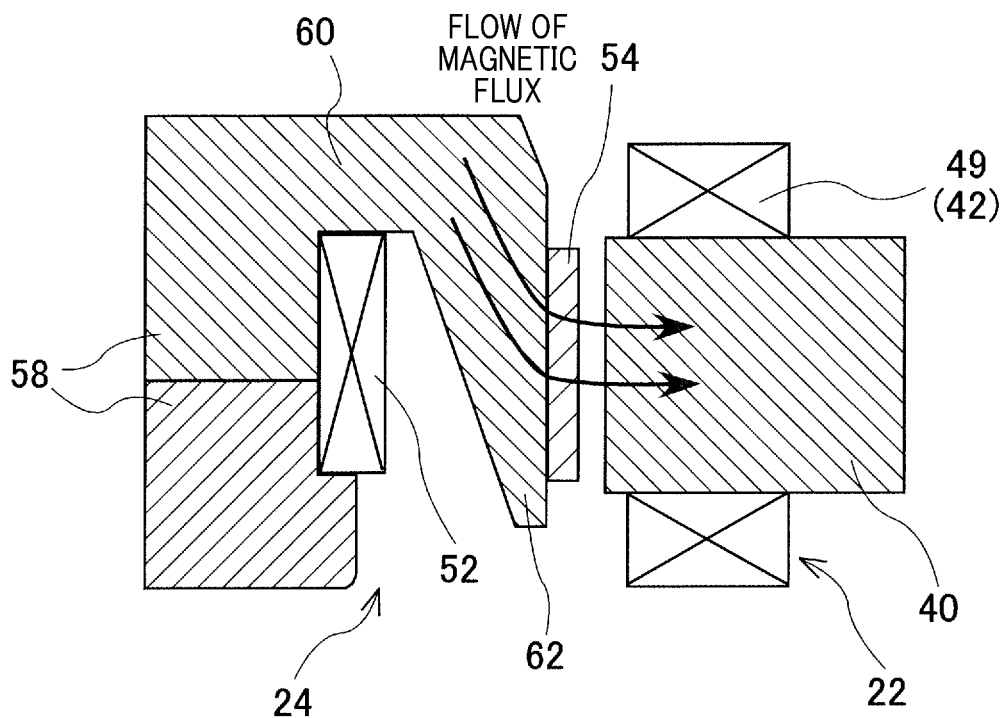
FIG. 7 is a partially cross-sectional view of the stator and the rotor illustrating the flow of magnetic flux from the rotor to the stator in the rotating electric machine.

In general, the slot-accommodated parts 48 of the armature coil 42, which are accommodated in the slots 46, are surrounded by the stator core 40 and thus magnetically shielded. Therefore, it is difficult for the slot-accommodated parts 48 of the armature coil 42 to be affected by the alternating magnetic field from the rotor 24 as shown in FIG. 7; it is thus difficult for copper loss (i.e., so-called AC copper loss) due to the magnetic flux from the rotor 24 to occur in the slot-accommodated parts 48. On the other hand, the pair of coil end parts 49 of the armature coil 42 are not magnetically shielded. Therefore, it is easy for the pair of coil end parts 49 of the armature coil 42 to be affected by the alternating magnetic field from the rotor 24; it is thus easy for AC copper loss due to the magnetic flux from the rotor 24 to occur in the pair of coil end parts 49.

In this regard, in the present embodiment, the rotating electric machine 20 includes the stator 22 and the rotor 24 that are radially opposed to each other with the predetermined air gap formed therebetween. The stator 22 includes the cylindrical stator core 40 on which the armature coil 42 is wound. The armature coil 42 has the slot-accommodated parts 48, which are accommodated in the slots 46 of the stator core 40, and the pair of coil end parts 49 protruding axially outward respectively from the two axial ends of the stator core 40. The rotor 24 includes the tubular short-circuiting member 54 that is arranged radially outside the claw-shaped magnetic pole portions 62 to cover the radially outer surfaces of the claw-shaped magnetic pole portions 62. The short-circuiting member 54 is fixed to the claw-shaped magnetic pole portions 62.

Figure 6:
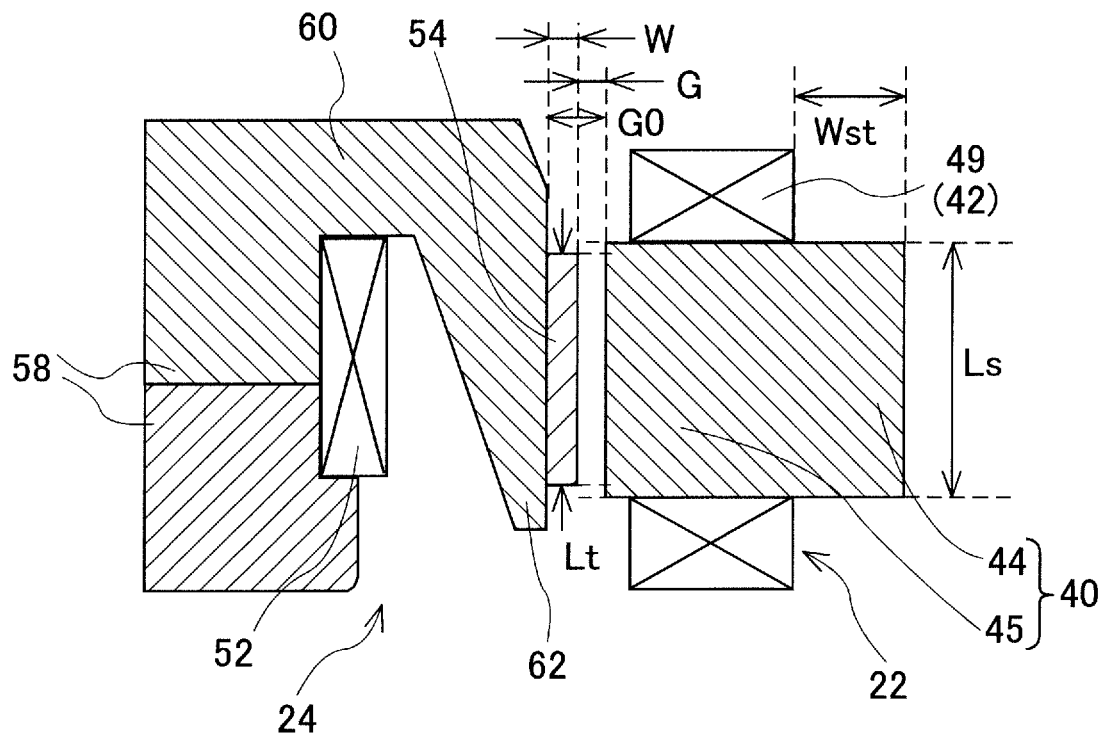
FIG. 6 is a partially cross-sectional view of a stator and the rotor illustrating dimensional relationships in the rotating electric machine.

As shown in FIG. 6, axial end portions of the disc portions 60 of the field core 50 and axial end portions (more particularly, proximal end portions) of the claw-shaped magnetic pole portions 62 protrude axially outward from the corresponding axial ends of the stator core 40 (more particularly, the teeth 45). Moreover, the short-circuiting member 54 is provided within an axial range between the two axial ends of the stator core 40. Specifically, the short-circuiting member 54 has an axial length Lt that is smaller than the axial length Ls of the stator core 40. Furthermore, the short-circuiting member 54 is fixed to the claw-shaped magnetic pole portions 62 so as to radially face the stator core 40 over the entire axial length Lt thereof.

The short-circuiting member 54 has the predetermined radial thickness W. The stator core 40 has its two axial end portions radially facing the claw-shaped magnetic pole portions 62 through an air gap G0 and its axial central portion radially facing the short-circuiting member 54 of the rotor 24 through a predetermined air gap G (=G0−W) that is smaller than the air gap G0. The radial thickness W of the short-circuiting member 54 is larger than or equal to ½ of the air gap G0 (i.e., W/G0≥½); the air gap G0 is the radial distance between the radially outer surfaces of the claw-shaped magnetic pole portions 62 and the stator core 40 (more specifically, the radially inner end surfaces of the teeth 45). The relationship between the radial thickness W and the air gap G0 is specified for making it easy for magnetic flux generated in the rotor 24 to concentrate on the short-circuiting member 54 without leaking to the sides of the axial end surfaces of the stator core 40.

In the rotating electric machine 20 having the above-described structure, the short-circuiting member 54, which is arranged radially outside the claw-shaped magnetic pole portions 62, is provided within the axial range between the two axial ends of the stator core 40. Therefore, in the rotor 24, only the short-circuiting member 54 faces the stator core 40 at the shortest distance over the entire axial length Lt of the short-circuiting member 54. Consequently, magnetic flux transfer between the rotor 24 and the stator 22 is made via the short-circuiting member 54.

Figure 8:
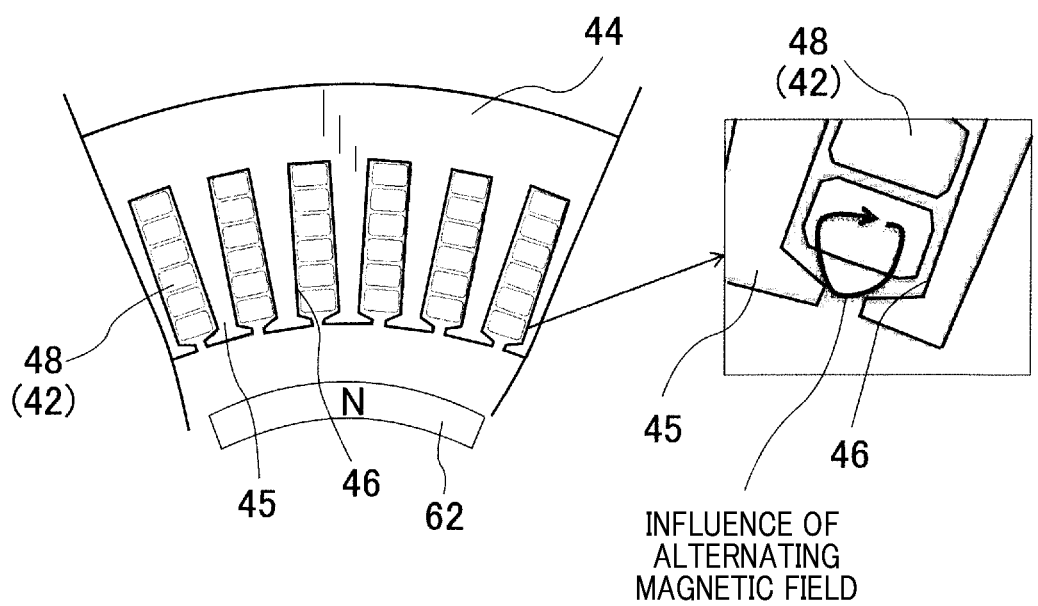
FIG. 8 is a schematic view illustrating the flow of magnetic flux from the rotor to the stator in the rotating electric machine.
Figure 9:
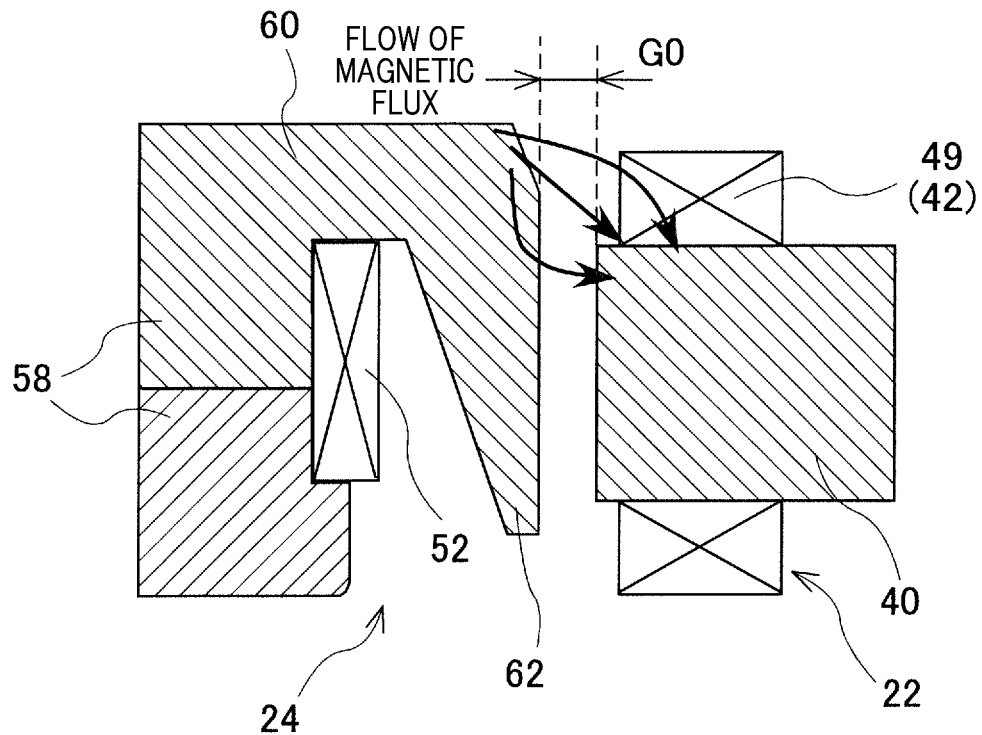
FIG. 9 is a partially cross-sectional view of a stator and a rotor in a comparative example, illustrating the flow of magnetic flux from the rotor to the stator.

Accordingly, as shown in FIG. 8, when the N-pole magnetic flux and the S-pole magnetic flux alternately flow in the pole cores of the rotor 24, it is possible to cause the magnetic flux to concentrate on the short-circuiting member 54; it is also possible to cause the magnetic flux guided to the short-circuiting member 54 to flow in the radial direction to the stator core 22 and perpendicularly cross the slot-accommodated parts 48 of the armature coil 42. That is, it is possible to suppress the magnetic flux due to the alternating magnetic field from having an axial component as in a comparative example shown FIG. 9 and flowing, for example, from the disc portions 60 to the axial ends of the stator 22 crossing the coil end parts 49 of the armature coil 42. As a result, it is possible to suppress the magnetic flux from the rotor 24 from crossing the armature coil 42 of the stator 22 without passing through the short-circuiting member 54.

Figure 10:
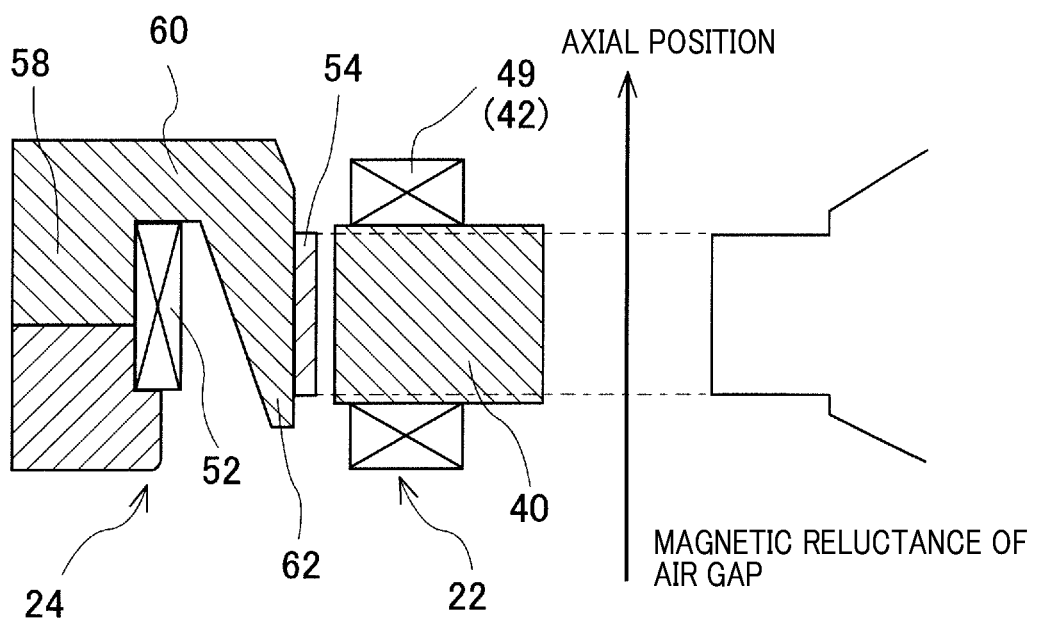
FIG. 10 is a schematic view illustrating the relationship between magnetic reluctance and axial position in an air gap between the rotor and the stator in the rotating electric machine according to the embodiment.
Figure 11:
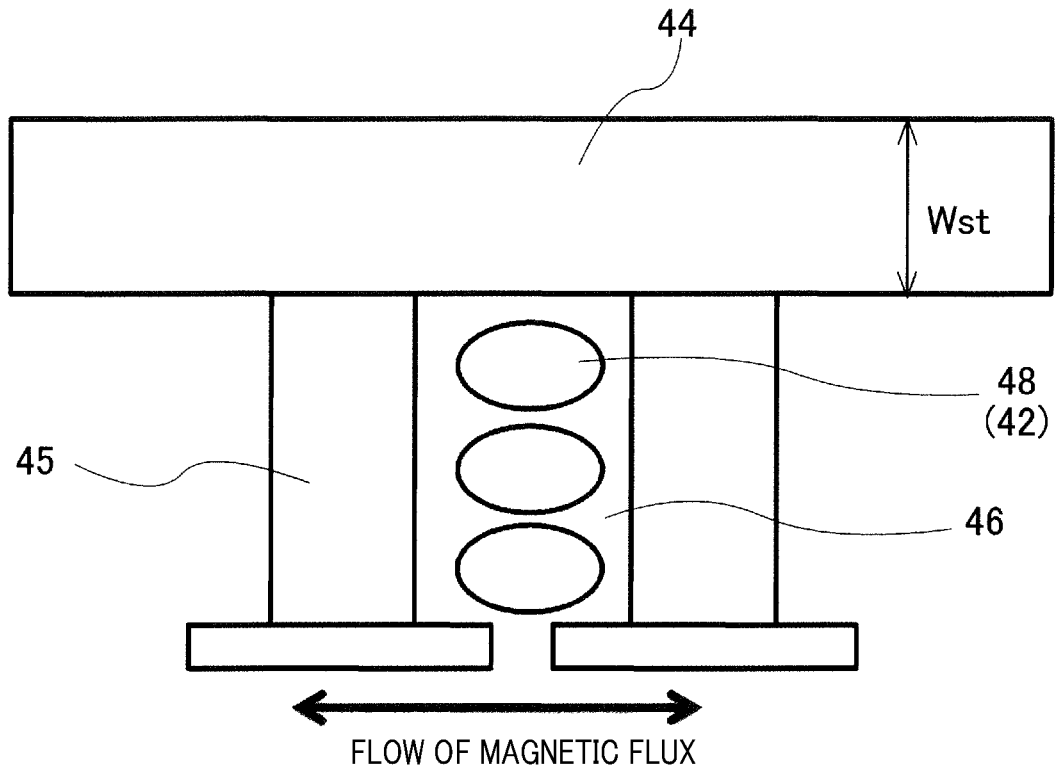
FIG. 11 is a schematic plan view, along an axial direction, of part of the stator of the rotating electric machine according to the embodiment, illustrating eddy current generated when the magnetic flux caused by an alternating magnetic field has no axial component.

As shown in FIG. 10, in the air gap between the rotor 24 and the stator 22, magnetic reluctance is extremely low within the axial range where the short-circuiting member 54 is provided and extremely high outside the axial range (more specifically, extremely high at the coil end parts 49 and at the axial end portions of the stator core 40 which do not radially face the short-circuiting member 54). Moreover, the magnetic reluctance sharply changes at the boundaries between the axial range where the short-circuiting member 54 is provided and the axial ranges where no short-circuiting member 54 is provided. Therefore, as described above, the magnetic flux generated in the rotor 24 concentrates on the short-circuiting member 54 and then flows to the stator 22. Hence, in the rotating electric machine 20 according to the present embodiment, when the alternating magnetic field is generated in the rotor 24, it is possible to reduce AC copper loss occurring in the armature coil 42 of the stator 22 due to the magnetic flux from the rotor 24.

Figure 12:
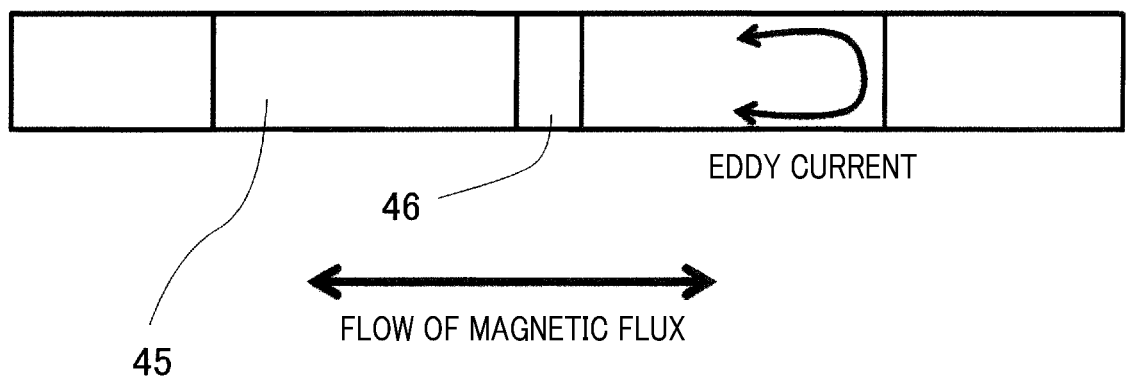
FIG. 12 is a schematic plan view, from the radially inner side, of part of the stator of the rotating electric machine according to the embodiment, illustrating the eddy current generated when the magnetic flux caused by the alternating magnetic field has no axial component.

Moreover, in the present embodiment, the stator core 40 of the stator 22 is constituted of a laminate in which sheets, such as magnetic steel sheets, are laminated in the axial direction. When the alternating magnetic field is generated, the magnetic flux from the rotor 24, which crosses the stator 22, flows alternately to one side and the other side in the circumferential direction as indicated with a straight-line arrow in FIGS. 11 and 12. Moreover, when the magnetic flux has no axial component, the magnetic flux perpendicularly crosses the radially inner end surfaces of the teeth 45 of the stator core 40 from the radially inner side. Consequently, as shown in FIG. 12, eddy current is generated which draws loops around axes extending in the radial direction. The eddy current is formed in a plane extending in the axial direction. As described above, the stator core 40 is constituted of the laminate in which the sheets are laminated in the axial direction. Therefore, it is possible to suppress the eddy current by suitably setting the axial thickness of the sheets taking into account the skin depth and/or the pitch of insulating layers provided between adjacent sheets.

Figure 13:
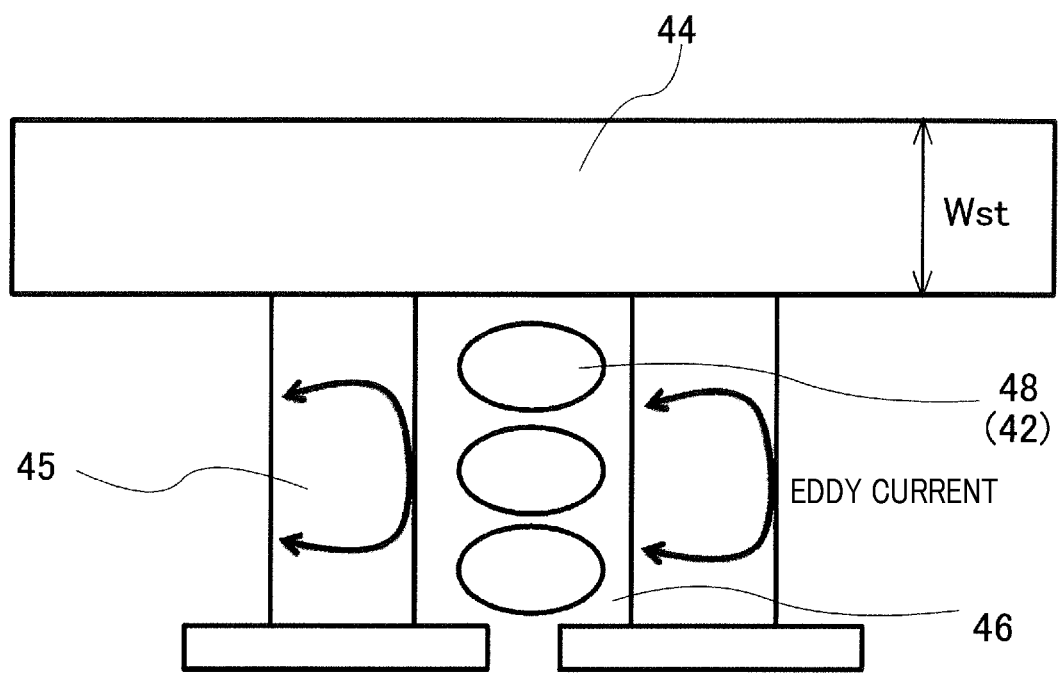
FIG. 13 is a schematic plan view, along the axial direction, of part of the stator of the rotating electric machine according to the embodiment, illustrating eddy current generated when the magnetic flux caused by the alternating magnetic field has an axial component.
Figure 14:
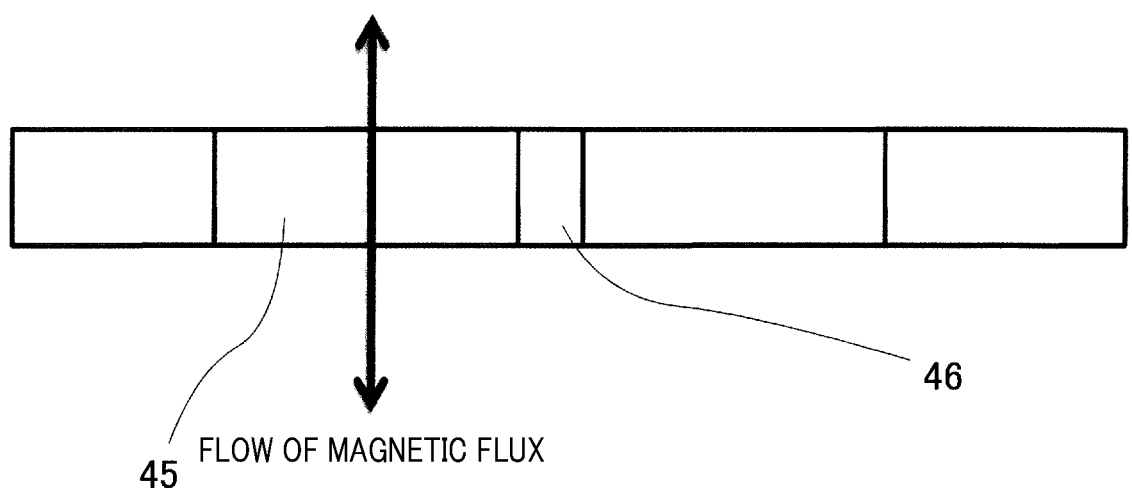
FIG. 14 is a schematic plan view, from the radially inner side, of part of the stator of the rotating electric machine according to the embodiment, illustrating the eddy current generated when the magnetic flux caused by the alternating magnetic field has the axial component.

On the other hand, when the alternating magnetic field is generated and the magnetic flux from the rotor 24, which crosses the stator 22, has an axial component as indicated with a straight-line arrow in FIG. 14, the magnetic flux crosses the axial end surfaces of the stator core 40 from the axially outer side. Consequently, as shown in FIG. 13, eddy current is generated which draws loops around axes extending in the axial direction. The eddy current is formed in a plane perpendicular to the axial direction. Therefore, it is impossible to effectively suppress the eddy current by adjusting the axial thickness of the sheets and/or the pitch of the insulating layers.

In this regard, in the rotating electric machine 20 according to the present embodiment, the short-circuiting member 54 is provided within the axial range between the two axial ends of the stator core 40. Consequently, it is possible to prevent magnetic flux having an axial component from flowing into the stator core 40, thereby effectively suppressing eddy current formed in a plane perpendicular to the axial direction of the stator core 40.

Figure 15:
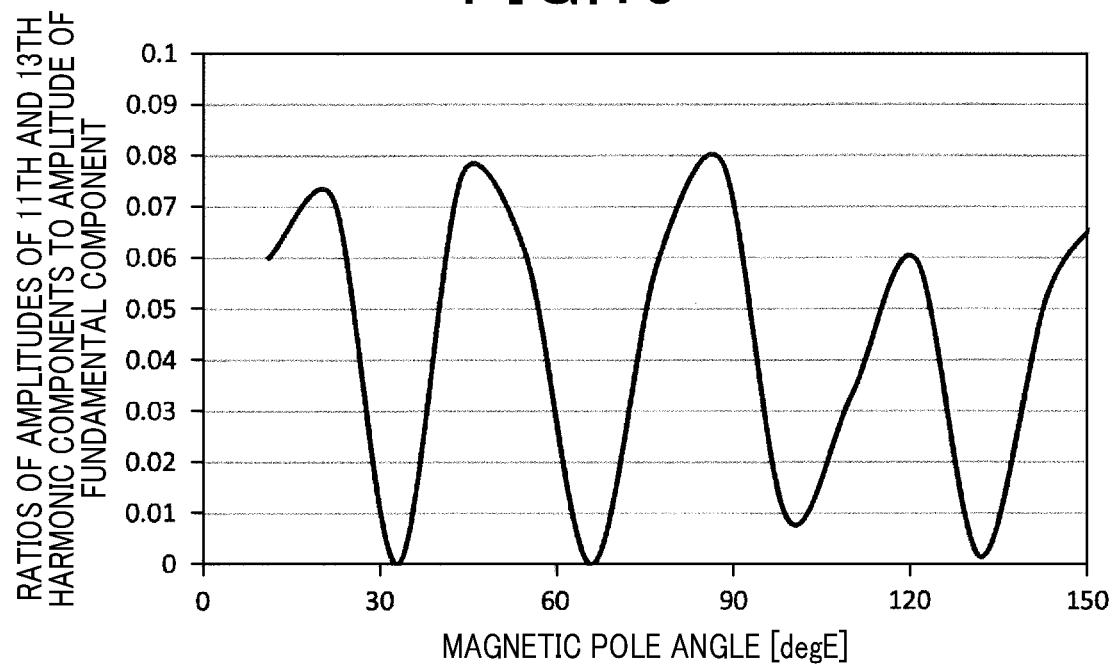
FIG. 15 is a graph showing the changes, with magnetic pole angle, of the ratios of the amplitudes of the eleventh and thirteenth harmonic components to the amplitude of the fundamental component of the magnetic flux in the rotating electric machine according to the embodiment.

Magnetic flux generated in the stator 22 reaches the pole cores of the rotor 24 via the short-circuiting member 54. In causing the rotating electric machine 20 to operate, all of magnetic circuits formed in the rotating electric machine 20 have a d axis and a q axis. Both d-axis magnetic flux and q-axis magnetic flux simultaneously act on the annular part 44 of the stator core 40. Accordingly, the maximum amount of magnetic flux flowing in the rotating electric machine 20 is limited by the radial thickness of the annular part 44 of the stator core 40. For example, with the structure where the stator 22 includes the distributedly-wound armature coil 42 and the stator core 40 whose slot multiplier number n is equal to 2, when the number of the teeth 45 of the stator core 40 per pole of the rotor 24 is equal to 12, harmonic iron loss may occur due to the eleventh and thirteenth harmonic components with respect to the fundamental component of magnetic flux generated by electric current supplied to each phase winding. That is, the frequencies of the eleventh and thirteenth harmonic components are respectively 11 times and 13 times the frequency of the fundamental component of the magnetic flux generated by electric current supplied to each phase winding. Moreover, as shown in FIG. 15, the amplitudes of the eleventh and thirteenth harmonic components are smaller than $1/12 (\approx 0.083)$ times the amplitude of the fundamental component. These harmonic components of the magnetic flux cause iron loss to occur. In addition, the slot multiplier number n denotes the number of the slots 46 per phase of the armature coil 42 and per pole of the rotor 24.

In this regard, in the rotating electric machine 20 according to the present embodiment, with respect to the radial thickness Wst of the annular part 44 of the stator core 40, the short-circuiting member 54 has the radial thickness W satisfying both the relationship of $W/Wst > 1/12$ and the relationship of $W < Wst$. The short-circuiting member 54 is made of a material having higher electrical resistivity than the claw-shaped magnetic pole portions 62 or has electrically insulating layers. With the above structure, it is possible to cause the fundamental component of the magnetic flux generated by electric current supplied to each phase winding of the stator 22 to be reliably received by the claw-shaped magnetic pole portions 62 of the rotor 24 while causing the eleventh and thirteenth harmonic components of the magnetic flux to be received by the short-circuiting member 54 of the rotor 24. Consequently, in the rotating electric machine 20, it is possible to reduce the harmonic iron loss caused by the eleventh and thirteenth harmonic components with respect to the fundamental component of the magnetic flux generated by electric current supplied to each phase winding.

In addition, generalizing the slot multiplier number n, to reduce the harmonic iron loss as described above, it is necessary for the radial thickness W of the short-circuiting member 54 and the radial thickness Wst of the annular part 44 of the stator core 40 to satisfy the relationship of $W/Wst > 1/(6 \cdot n)$. Moreover, in the case of the armature coil 42 of the stator 22 being concentratedly wound, it is necessary to cope with the sixth (2 poles×3 phases) vibration which is the fundamental excitation vibration; thus it is necessary for the radial thickness W of the short-circuiting member 54 and the radial thickness Wst of the annular part 44 of the stator core 40 to satisfy the relationship of $W/Wst > 1/6$.

Moreover, in the case of the armature coil 42 being a three-phase concentratedly-wound coil, which has three phases (or phase windings) offset from each other by 120° in electrical angle and the sum of electromagnetic forces of the three phases equal to zero, and the number P of poles of the rotor 24 and the number N of slots of the stator 22 satisfying the relationship of P:N=2:3 or P:N=4:3, it is preferable for the radial thickness W of the short-circuiting member 54 and the radial thickness Wst of the annular part 44 of the stator core 40 to satisfy the relationship of $W/Wst > 1/6$. In this case, it is possible to ensure excellent quietness of the rotating electric machine 20.

As described above, the rotating electric machine 20 according to the present embodiment includes the stator 22 and the rotor 24. The stator 22 includes the stator core 40 and the armature coil 42 wound on the stator core 40. The rotor 24 is arranged radially inside the stator 22 to radially face the stator 22. The rotor 24 includes: the field core 50 having the claw-shaped magnetic pole portions 62 for respectively forming the magnetic poles the polarities of which are alternately different in the circumferential direction; the field coil 52 wound on the field core 50; and the cylindrical short-circuiting member 54 that is arranged radially outside the claw-shaped magnetic pole portions 62 to cover the radially outer surfaces of the claw-shaped magnetic pole portions 62 and magnetically connects each circumferentially-adjacent pair of the claw-shaped magnetic pole portions 62. The short-circuiting member 54 is provided within the axial range between the two axial ends of the stator core 40.

With the above configuration, when the alternating magnetic field is generated in the rotor 24, it is possible to cause the magnetic flux due to the alternating magnetic field to concentrate on the short-circuiting member 54; it is also possible to cause the magnetic flux guided to the short-circuiting member 54 to flow in the radial direction to the stator 22 and perpendicularly cross the slot-accommodated parts 48 of the armature coil 42. That is, it is possible to suppress the magnetic flux due to the alternating magnetic field from having an axial component and flowing to the axial ends of the stator 22 crossing the coil end parts 49 of the armature coil 42. As a result, it is possible to suppress the magnetic flux from the rotor 24 from crossing the armature coil 42 of the stator 22 without passing through the short-circuiting member 54. Hence, when the alternating magnetic field is generated in the rotor 24, it is possible to reduce AC copper loss occurring in the armature coil 42 of the stator 22 due to the magnetic flux from the rotor 24.

In the rotating electric machine 20, the axial length Lt of the short-circuiting member 54 is smaller than the axial length Ls of the stator core 40. With this configuration, it is possible to provide the short-circuiting member 54 within the axial range between the two axial ends of the stator core 40.

In the rotating electric machine 20, the radial thickness W of the short-circuiting member 54 is larger than or equal to ½ of the radial distance G0 between the claw-shaped magnetic pole portions 62 and the stator core 40. With this configuration, it is easy for magnetic flux generated in the rotor 24 to concentrate on the short-circuiting member 54 without leaking to the two axial ends of the stator core 40.

In the rotating electric machine 20, the radial thickness W of the short-circuiting member 54 is smaller than the radial thickness Wst of the annular part 44 of the stator core 40. With this configuration, it is possible to reduce iron loss (i.e., eddy current loss) due to the harmonic components of the magnetic flux generated by electric current supplied to each phase winding of the stator 22 while causing the fundamental component of the magnetic flux to be reliably received by the rotor 24.

In the rotating electric machine 20, the radial thickness W of the short-circuiting member 54 and the radial thickness Wst of the annular part 44 of the stator core 40 satisfy the relationship of W/Wst>1/(6·n) (where n is the slot multiplier number). With this configuration, it is possible to reduce harmonic iron loss which depends on the number of the slots 46 of the stator core 40.

In the rotating electric machine 20, with the slot multiplier number n being equal to 2, the radial thickness W of the short-circuiting member 54 and the radial thickness Wst of the annular part 44 of the stator core 40 satisfy the relationship of W/Wst>1/12. With this configuration, it is possible to reduce the harmonic iron loss which occurs due to the eleventh and thirteenth harmonic components with respect to the fundamental component of the magnetic flux generated by electric current supplied to each phase winding and which depends on the number of the slots 46 of the stator core 40.

Moreover, in the rotating electric machine 20, the armature coil 42 is a concentratedly-wound coil which has three phases offset from each other by 120° in electrical angle. The number P of poles of the rotor 24 and the number N of slots of the stator 22 satisfy the relationship of P:N=2:3 or P:N=4:3. The radial thickness W of the short-circuiting member 54 and the radial thickness Wst of the annular part 44 of the stator core 40 satisfy the relationship of W/Wst>⅙. With this configuration, it is possible to ensure excellent quietness of the rotating electric machine 20 while reducing the harmonic iron loss which depends on the number of the slots 46 of the stator core 40.

In addition, the present invention is not limited to the above-described embodiment and various modifications may be made without departing from the spirit of the present invention.

DESCRIPTION OF REFERENCE SIGNS

20: rotating electric machine, 22: stator, 24: rotor, 40: stator core, 42: armature coil, 44: annular part, 45: teeth, 46: slots, 48: slot-accommodated parts, 49: coil end parts, 50: field core, 52: field coil, 54: short-circuiting member, 58: boss portions, 62: claw-shaped magnetic pole portions.

The invention claimed is:

1. A rotating electric machine comprising:
a stator including a stator core and an armature coil wound on the stator core; and
a rotor arranged radially inside the stator to radially face the stator, the rotor including a field core, a field coil and a tubular short-circuiting member, the field core having a plurality of magnetic pole portions for respectively forming a plurality of magnetic poles the polarities of which are alternately different in a circumferential direction, the field coil being wound on the field core, the short-circuiting member being arranged radially outside the magnetic pole portions to cover radially outer surfaces of the magnetic pole portions and magnetically connecting each circumferentially-adjacent pair of the magnetic pole portions,
wherein:
the short-circuiting member is provided within an axial range between two axial ends of the stator core;
a radial thickness of the short-circuiting member is smaller than a radial thickness of an annular part of the stator core; and
W/Wst>1/(6·n), where n is a slot multiplier number, W is the radial thickness of the short-circuiting member and Wst is the radial thickness of the annular part of the stator core.

2. The rotating electric machine as set forth in claim 1, wherein an axial length of the short-circuiting member is smaller than an axial length of the stator core.

3. The rotating electric machine as set forth in claim 1, wherein the radial thickness of the short-circuiting member is larger than or equal to ½ of a radial distance between the magnetic pole portions and the stator core.

4. The rotating electric machine as set forth in claim 1, wherein n=2, and W/Wst >1/12.

5. The rotating electric machine as set forth in claim 1, wherein the armature coil is a concentratedly-wound coil which has three phases offset from each other by 120° in electrical angle,
P:N=2:3 or P:N=4:3, where P is the number of poles of the rotor and N is the number of slots of the stator, and
W/Wst >⅙, where W is the radial thickness of the short-circuiting member and Wst is the radial thickness of the annular part of the stator core.

6. A rotating electric machine comprising:
a stator including a stator core and an armature coil wound on the stator core; and
a rotor arranged radially inside the stator to radially face the stator, the rotor including a field core, a field coil and a tubular short-circuiting member, the field core having a plurality of magnetic pole portions for respectively forming a plurality of magnetic poles the polarities of which are alternately different in a circumferential direction, the field coil being wound on the field core, the short-circuiting member being arranged radially outside the magnetic pole portions to cover radially outer surfaces of the magnetic pole portions and magnetically connecting each circumferentially-adjacent pair of the magnetic pole portions, wherein:

the short-circuiting member is provided within an axial range between two axial ends of the stator core;

the armature coil is a concentratedly-wound coil which has three phases offset from each other by 120° in electrical angle;

P:N=2:3 or P:N=4:3, where P is the number of poles of the rotor and N is the number of slots of the stator; and W/Wst >1/6, where W is a radial thickness of the short-circuiting member and Wst is a radial thickness of an annular part of the stator core.

\* \* \* \* \*